United States Patent
Wüllrich et al.

(10) Patent No.: US 9,057,212 B2
(45) Date of Patent: Jun. 16, 2015

(54) LOCK ARRANGEMENT FOR A CONVERTIBLE TOP OF A CABRIOLET

(71) Applicant: Webasto-Edscha Cabrio GmbH, Stockdorf (DE)

(72) Inventors: Heinrich Wüllrich, Fürstenstein (DE); Filip Truksa, Brno (CZ); Jochen Haussmann, Andechs (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 14/296,525

(22) Filed: Jun. 5, 2014

(65) Prior Publication Data

US 2014/0361574 A1    Dec. 11, 2014

(30) Foreign Application Priority Data

Jun. 6, 2013    (DE) .......................... 10 2013 105 844

(51) Int. Cl.
  *B60J 7/185*    (2006.01)
  *E05C 3/12*    (2006.01)
(52) U.S. Cl.
  CPC . *E05C 3/12* (2013.01); *B60J 7/1851* (2013.01)
(58) Field of Classification Search
  CPC .............................. B60J 7/1851; B60J 7/1853
  USPC ........... 296/108, 121, 107.15, 107.17, 107.16
  See application file for complete search history.

(56) References Cited

U.S. PATENT DOCUMENTS

| 4,830,425 | A  | * | 5/1989 | Muscat ......................... 296/121 |
| 5,301,987 | A  | * | 4/1994 | Tokarz et al. ................... 292/39 |
| 7,559,585 | B2 | * | 7/2009 | Plesternings et al. ......... 292/201 |
| 2004/0021339 | A1 | * | 2/2004 | Taylor et al. .................. 296/121 |

FOREIGN PATENT DOCUMENTS

| DE | 3923695 C1 | 10/1990 |
| DE | 10160096 C1 | 4/2003 |
| DE | 102005018201 A1 | * 10/2006 |

OTHER PUBLICATIONS

Machine Translation of DE102005018201A1, printed from the EPO website, Oct. 1, 2014.*

* cited by examiner

*Primary Examiner* — Jason S Morrow
(74) *Attorney, Agent, or Firm* — Quarles & Brady LLP

(57) ABSTRACT

A convertible top of a cabriolet adjustable between a closed position spanning a vehicle interior and a storage position opening the vehicle interior toward the top includes a forward rigid roof element. The roof element extends in the transverse direction of the convertible top and can be secured to a forward cowl by at least one lock arrangement in a closed position of the convertible top. The lock arrangement includes a locking hook adjustable between a locked position and an open position and which is engaged with a corresponding locking element in the locked position. A holding device ensures that the locking hook and the corresponding locking element remain engaged in the closed position of the convertible top and in the locked position of the locking hook if the cowl is offset with regard to the rigid roof element.

7 Claims, 3 Drawing Sheets

LOCK ARRANGEMENT FOR A CONVERTIBLE TOP OF A CABRIOLET

CROSS REFERENCE TO RELATED APPLICATION

This application claims the priority benefit of German Patent Application No. 10 2013 105 844.2 filed on Jun. 6, 2013, which is fully incorporated herein by reference.

STATEMENT REGARDING FEDERALLY SPONSORED RESEARCH OR DEVELOPMENT

Not applicable.

FIELD OF THE INVENTION

The invention relates to a convertible top of a cabriolet.

BACKGROUND OF THE INVENTION

A convertible top of this kind is known from practice and comprises a convertible top rod assembly, by means of which a convertible top cover can be expanded or rigid roof segments of a so-called RHT (retractable hard top) can be adjusted. By means of the convertible top rod assembly, the convertible top can be adjusted between a closed position spanning a vehicle interior and a storage position opening the vehicle interior toward the top. Generally, the convertible top comprises a rigid roof element that extends in the transverse direction of the convertible top, is arranged at the front or forward side in the closed position of the convertible top and can be secured to a forward cowl of the respective vehicle by means of two lock arrangements. The cowl forms an upper edge of a windshield frame of the respective vehicle, which extends in the transverse direction of the vehicle. The lock arrangements can each comprise a locking hook which is pivotably mounted and adjustable between a locked position and an open position. In the locked position, the locking hook is engaged with a corresponding locking element which is formed on the cowl or rigidly connected to the cowl. Thus, the convertible top is secured against opening unintentionally. Additionally, the lock arrangements each comprise a so-called centering pin, which dives into a corresponding recess when the convertible top is being closed, said recess being formed in the forward cowl. Thus, the convertible top can be brought into its closed position with positional accuracy.

With the convertible top described above, there is the risk that the rigid roof element and the cowl may become offset to each other in case of an accident. As a result, the locking hook may disengage from the locking element, which would lead to the rigid roof element disengaging from the forward cowl. This is undesirable for safety reasons.

SUMMARY OF THE INVENTION

It is the object of the invention to provide a convertible top of a cabriolet of the kind mentioned in the introduction which meets higher safety requirements as compared to the above-described state of the art.

It is the core of the invention that a holding device prevents the rigid roof element from disengaging from the cowl in case the cowl becomes offset with respect to the rigid roof element or the convertible top. Instead, the holding device, which acts as a safety catch, causes the locking hook and the corresponding locking element to remain engaged. In other words, the holding device prevents the convertible top from unintentionally disengaging from the vehicle structure, i.e. from the cowl, in particular in case of an accident. Thus, the convertible top according to the invention can meet high safety requirements.

In a special embodiment of the convertible top according to the invention, the holding device comprises a holding pin fixed to the convertible top, which, in the closed position of the convertible top, engages into a long hole that is formed on the cowl. Preferably, the holding pin has an annular collar, which is in particular formed closely to its free front side, the holding pin penetrating a wide portion of the long hole in the closed position of the convertible top. The wide portion of the long hole allows the annular collar to pass through the long hole when the convertible top is being closed. The holding pin is tapered between the annular collar and its bearing point. The diameter of the holding pin in the tapered portion corresponds to the width of the long hole in the non-wide portions. If now an offset occurs between the cowl and the rigid roof element, the holding pin slides out of the wide portion of the long hole into the tapered or non-wide portion. The edge of the long hole facing away from the wide portion forms a stop for the holding pin. When the stop is reached, the locking hook and the corresponding locking element are still engaged. This means that the axial extension of the long hole limits the offset between the cowl and the rigid roof element and it does so to that effect that the locking hook and the corresponding locking element remain engaged even in case of maximum offset. Moreover, the annular collar of the locking pin prevents the rigid roof element from disengaging from the cowl in the axial direction of the holding pin.

The long hole with the wide portion can be formed in particular in the manner of a keyhole. However, it is also conceivable that the long hole is tapered on both sides of the wide portion. Thus, the wide portion is arranged at least largely centrally with respect to the longitudinal axis of the long hole. In this embodiment, the long hole forms a stop for the holding pin in two offset directions, namely both in the axial direction of the long hole and in the axial direction of the holding pin by way of the interaction between the annular collar of the holding pin and the edge portions adjacent to the narrowed portions of the long hole.

In an alternative embodiment of the convertible top according to the invention, the holding device comprises a stop pin which is formed on the forward cowl in such a manner that a path travelled by the locking hook when it is pivoted between the locked position and the open position runs between the stop pin and the corresponding locking element. In case of an offset between the forward cowl and the rigid roof element, the stop pin forms a stop for the locking hook. When reaching the stop, the locking hook continues to be in engagement with the corresponding locking element. Thus, the stop pin, too, forms a safety catch for the locking hook and, consequently, a safety catch for the rigid roof element so that the latter cannot disengage from the forward cowl, in particular in case of an accident.

To ensure that the locking hook does not accidentally slide along the stop pin when the locking hook drives onto the stop pin, in a special embodiment of the convertible top according to the invention, the locking hook has a recess or a nose on its side facing away from an engagement surface, said recess or nose forming a counter stop for the stop pin if there is an offset between the cowl and the rigid roof element in the closed position of the convertible top. The engagement surface is the surface of the locking hook that bears against the corresponding locking element in the engaged position or locked position. The recess or nose, which is formed on the side facing away from the engagement surface, thus acts in the manner of a hook into which the stop pin dives.

To be able to also secure the locking hook at a right angle with respect to its pivot axis, the stop pin is preferably arranged between two bearing flaps that are formed on the cowl, the locking hook having a thickness in the direction of its pivot axis that is smaller than the distance between the bearing flaps. In case of an offset between the cowl and the rigid roof element, the locking hook can then dive into the space between the two bearing flaps until it abuts preferably with its recess against the stop pin. To ensure a smooth driving of the locking hook onto the stop pin, the latter may be mounted rotatably.

Further advantages and advantageous embodiments of the subject-matter of the invention can be taken from the description, the drawing and the patent claims.

Example embodiments of a convertible top of a cabriolet according to the invention are illustrated in the drawing in a schematically simplified manner and will be explained in more detail in the following description.

DETAILED DESCRIPTION OF THE EXAMPLE EMBODIMENTS

Figure 1:
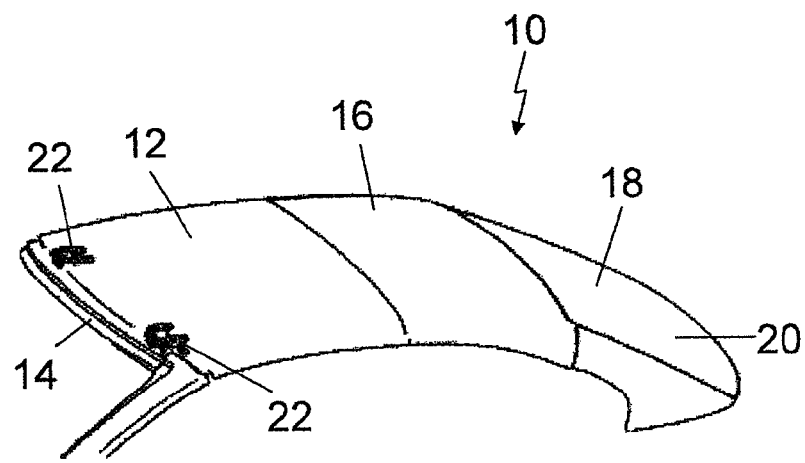
FIG. 1 shows a perspective view of a convertible top according to the invention with front-side lock arrangements.

In FIG. 1, a convertible top 10 of a cabriolet is illustrated, which is formed as a so-called RHT (retractable hard top) and which comprises three rigid roof elements, which are arranged behind one another in the longitudinal direction of the vehicle in the closed position illustrated in FIG. 1, namely a front-side or forward roof element 12, which is adjacent with its front-side edge to a forward cowl 14 of the respective vehicle in the closed position, a middle roof element 16, which is adjacent to a rear-side edge of the front-side roof element 12 in the closed position, and a rear element 18, which is adjacent to the rear-side edge of the middle roof element 16 in the closed position and comprises a rear window 20. The roof elements 12, 16 and 18 can be adjusted by means of a convertible top rod assembly (not illustrated) between a closed position illustrated in FIG. 1, spanning a vehicle interior, and a storage position, in which the roof elements 12, 16 and 18 are arranged one on top of the other in a rear-side convertible top storage box of the respective vehicle and the vehicle interior is open toward the top.

For securing the convertible top in its closed position illustrated in FIG. 1, two lock arrangements 22 are arranged in the forward or front-side edge area of the forward roof element 12, said lock arrangements 22 securing the roof element 12 and thus the convertible top 10 to the forward cowl 14, which forms an upper frame side of a windshield frame, said upper frame side extending in the transverse direction of the vehicle.

Figure 2:
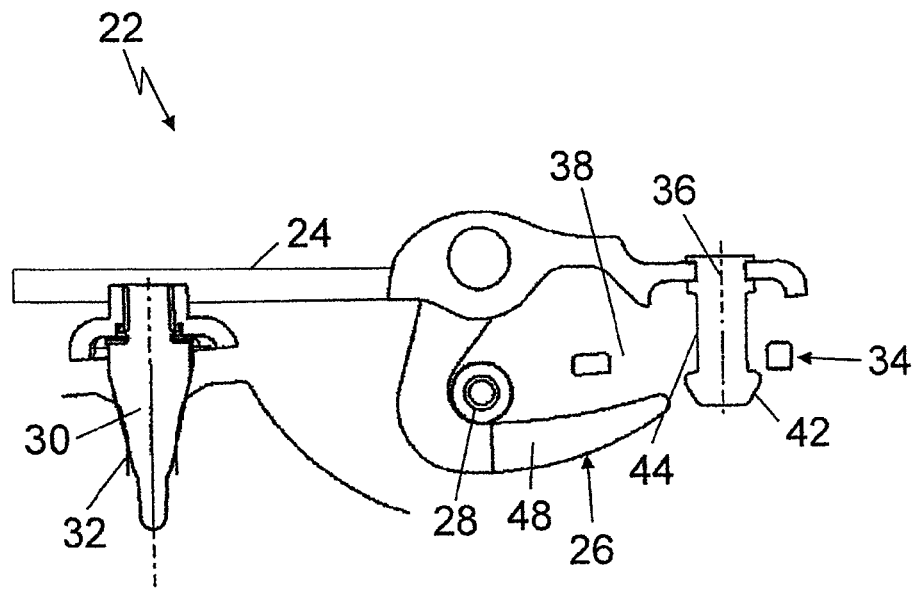
FIG. 2 shows a cut through a lock arrangement in the transverse direction of the convertible top.
Figure 3:
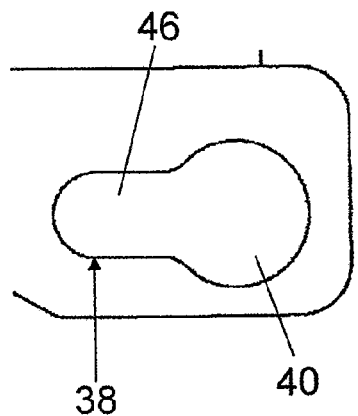
FIG. 3 shows a top view of a long hole of a holding device of the lock arrangement.

The lock arrangements 22, one of which is illustrated by itself in FIG. 2 and which are arranged mirror-symmetrically to each other with respect to a longitudinal central plane of the vehicle, each comprise a bearing plate 24 that is rigidly connected to the forward roof element 12. A locking hook 26 is pivotably mounted on the bearing plate 24, which can be adjusted between an open position and a locked position illustrated in FIG. 2 by means of a rod assembly (not illustrated). In the locked position, the locking hook 26 engages behind a locking bolt 28 that is formed on the forward cowl 14 and thus forms a locking element that corresponds with the locking hook 26. The locking bolt 28 can be equipped with a roller so as to provide for a smooth engagement by the locking hook 26.

To ensure that the forward roof element 12 is secured to the cowl 14 with positional accuracy, each of the lock arrangements 22 further comprises an at least approximately conical centering pin 30, which is mounted to the bearing plate 24. In the closed position of the convertible top 10, the centering pin 30 protrudes downward so that it engages into a centering recess 32, which is also formed on the forward cowl 14. The centering pins 30 ensure that the forward roof element 12 is moved against the forward cowl 14 in a precise manner and with positional accuracy during the closing process.

To ensure that the locking hook 26 and the locking bolt 28 always remain engaged if the cowl 14 is unintentionally offset with respect to the forward roof element 12 in the closed position of the convertible top 10 and in the locked position of the locking hook 26, e.g. in case of a collision of the vehicle, the lock arrangements 22 each additionally comprise a holding device 34, which comprises a holding pin 36 that is also mounted to the bearing plate of the respective lock arrangement 22 and protrudes downward in the direction of the cowl 14 in the locked position of the convertible top. The holding pin 36 penetrates a keyhole-shaped long hole 38 in the area of a wide portion 40, said long hole 38 extending in the transverse direction of the convertible top. The holding pin 36 has a front-side annular collar 42, which is arranged on the side of the long hole 38 facing away from the bearing plate 24 in the closed position of the convertible top and whose diameter corresponds to the diameter of the wide portion 40 of the long hole 38. In the direction of the bearing plate 24, adjacent to the annular collar, there is a cylindrical, tapered portion 44 whose diameter corresponds to the width of the long hole 38 in a portion 46 of smaller width adjacent to the wide portion 40.

The long hole 38 has an axial extension which is smaller than the length of an engagement portion 48 of the locking hook 26 in the transverse direction of the convertible top when the locking hook 26 is in its locked position. Thus, it is ensured that the locking hook 26 and the locking bolt 28 remain engaged in the closed position of the convertible top 10 and in the locked position of the locking hook 26 if the cowl 14 becomes offset with respect to the forward roof element 12, e.g. in case of an accident or the like. The maximum offset between the forward roof element 12 and the cowl 14 is limited by the axial extension of the long hole 38 because the holding pin 36 then moves into the tapered portion 46 of the long hole 38 and abuts against its axial edge. Additionally, the annular collar 42 prevents the holding pin 36 from being pulled out of the tapered portion 46 of the long hole 38.

Figure 4:
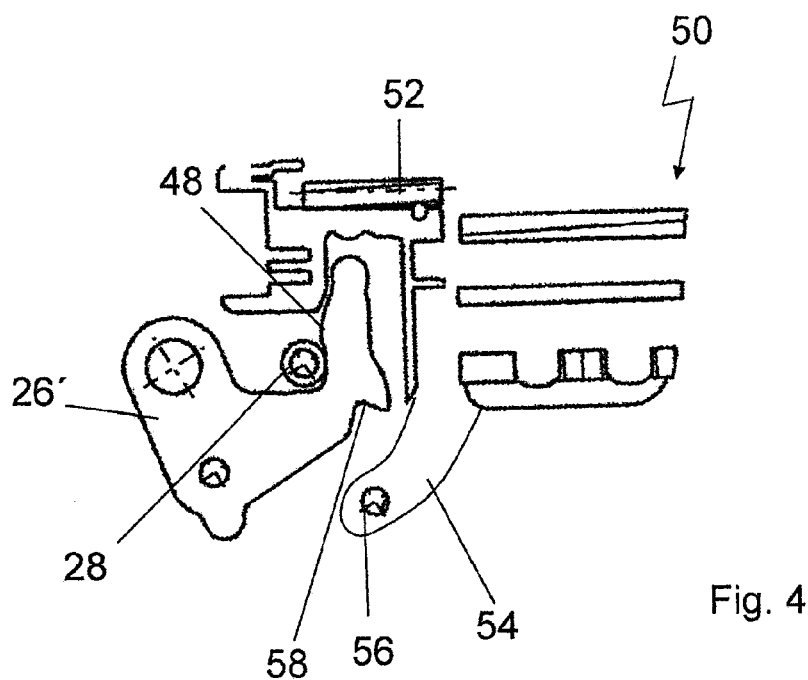
FIG. 4 shows a horizontal cut through an alternative embodiment of a lock arrangement.
Figure 5:
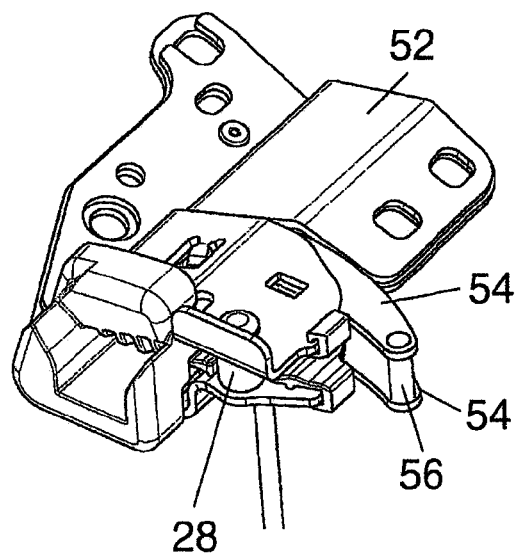
FIG. 5 shows a perspective view of a locking portion of the lock arrangement according to FIG. 4 attached to a forward cowl of the respective vehicle.
Figure 6:
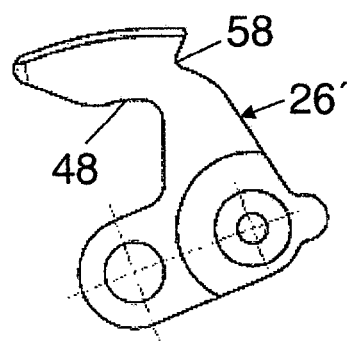
FIG. 6 shows a top view of a locking hook of the lock arrangement according to FIG. 4.

In FIGS. 4 to 6, an alternative embodiment of a lock arrangement 50 of a convertible top of the kind illustrated in FIG. 1 is shown. The lock arrangement 50 also comprises a locking hook 26' which is pivotably mounted on the forward roof element 12 and can be pivoted by means of a rod assembly. In its closed position, the locking hook 26' engages behind a corresponding locking element 28, which can be formed as a locking bolt with or without a roller. The locking bolt 28 is formed on a lock counter bearing 52 which is arranged on the forward cowl 14 of the respective vehicle.

Furthermore, bearing flaps 54 are arranged on the lock counter bearing 52, which are parallel to each other and oriented horizontally and which project in the forward direction of the vehicle, a stop pin 56 being arranged between them whose axis runs in the vertical direction of the vehicle and which forms a holding device for the locking hook 26'. The stop pin 56 has a distance from the locking bolt 28 that is smaller than a length of an engagement portion 48 of the locking hook 26' in its locked position in the longitudinal direction of the vehicle. The geometry of the locking hook 26' and the arrangement of the stop pin 56 are further chosen such that, when pivoting between the locked or engaged position and the open position, the locking hook 26' has a travel path that runs between the stop pin 56 and the locking bolt 28. The stop pin 56 thus does not constitute an obstacle for the pivot motion of the locking hook 26' in the normal state.

However, if there is an offset between the forward cowl 14 and the forward roof element 12 of the convertible top in the closed position of the convertible top and in the locked or engaged position of the locking hook 26', the relative motion between the locking hook 26' and the cowl 14 or the locking bolt 28 is limited by the stop pin 56 because the locking hook 26' drives with a recess 58, formed by a nose on the side facing away from the engagement surface, onto the stop pin 56. The locking hook 26' remains engaged to the locking bolt 28 so that the forward roof element 12 remains connected to the forward cowl 14 as well. Moreover, the locking hook 26' is then arranged in the space between the two bearing flaps 54, which hold the locking hook 26' in position in the axial direction of the stop pin. The distance between the two bearing flaps 54 thus largely corresponds to the thickness of the locking hook 26' in that direction.

The invention claimed is:

1. A convertible top of a cabriolet, which is adjustable between a closed position spanning a vehicle interior and a storage position opening the vehicle interior, said convertible top comprising:
    at least one forward rigid roof element extending in a transverse direction of the convertible top; and
    at least one lock arrangement securing said at least one forward rigid element to a forward cowl in the closed position of the convertible top, said lock arrangement including a locking hook and a holding device, said locking hook being moveable between a locked position and an open position, said locking hook being engaged with a corresponding locking element in the locked position, said holding device ensuring that the locking hook and the corresponding locking element remain engaged in the closed position of the convertible top and in the locked position of the locking hook if the cowl is offset with respect to the rigid roof element, wherein the holding device includes a holding pin fixed to the rigid roof element, said holding pin having an annular collar and engaging into a long hole having a wide portion and a narrow portion, said holding pin engaging into the wide portion of the long hole in the closed position of the convertible top, said long hole being formed on the cowl.

2. The convertible top according to claim 1, in which the wide portion is arranged at least largely centrally with respect to a longitudinal axis of the long hole.

3. The convertible top according to the claim 1, in which the holding device includes a stop pin formed on the cowl in such a manner that a path traveled by the locking hook when said locking hook is pivoted between the locked position and the open position runs between the stop pin and the corresponding locking element.

4. A convertible top of a cabriolet, which is adjustable between a closed position spanning a vehicle interior and a storage position opening the vehicle interior, said convertible top comprising:
    at least one forward rigid roof element extending in a transverse direction of the convertible top; and
    at least one lock arrangement securing said at least one forward rigid element to a forward cowl in the closed position of the convertible top, said lock arrangement including a locking hook and a holding device, said locking hook being movable between a locked position and an open position, said locking hook being engaged with a corresponding locking element in the locked position, said holding device ensuring that the locking hook and the corresponding locking element remain engaged in the closed position of the convertible top and in the locked position of the locking hook if the cowl is offset with respect to the rigid roof element, wherein the holding device includes a stop pin formed on the cowl in such a manner that a path traveled by the locking hook when said locking hook is pivoted between the locked position and the open position runs between the stop pin and the corresponding locking element.

5. The convertible top according to claim 4, in which the locking hook has a recess on a side of said locking hook facing a away from an engagement surface, said recess forming a counter stop for the stop pin in the closed position of the convertible top and in the locked position of the locking hook if there is an offset between the cowl and the rigid roof element.

6. The convertible top according to claim 4, in which the stop pin is arranged between two hearing flaps which are formed on the cowl and that the locking hook has a thickness in a direction of a locking hook pivot axis that is smaller than a distance between the bearing flaps.

7. The convertible top according to claim 4, in which the stop pin is mounted rotatably.

* * * * *

UNITED STATES PATENT AND TRADEMARK OFFICE
CERTIFICATE OF CORRECTION

| | | |
|---|---|---|
| PATENT NO. | : 9,057,212 B2 | Page 1 of 1 |
| APPLICATION NO. | : 14/296525 | |
| DATED | : June 16, 2015 | |
| INVENTOR(S) | : Heinrich Wüllrich et al. | |

It is certified that error appears in the above-identified patent and that said Letters Patent is hereby corrected as shown below:

In the claims,
Column 6, line 47
"hearing" should be --bearing--

Signed and Sealed this
Fifth Day of January, 2016

Michelle K. Lee
*Director of the United States Patent and Trademark Office*